United States Patent
Aupetit et al.

(10) Patent No.: US 11,591,924 B2
(45) Date of Patent: Feb. 28, 2023

(54) ASSEMBLY FOR A TURBOMACHINE TURBINE

(71) Applicant: SAFRAN CERAMICS, Le Haillan (FR)

(72) Inventors: Christophe Paul Aupetit, Moissy-Cramayel (FR); Thierry Guy Xavier Tesson, Moissy-Cramayel (FR); Clément Marie Benoît Roussille, Moissy-Cramayel (FR); Cécile Marie Emilienne Chevalier, Moissy-Cramayel (FR)

(73) Assignee: SAFRAN CERAMICS, Le Haillan (FR)

( * ) Notice: Subject to any disclaimer, the term of this patent is extended or adjusted under 35 U.S.C. 154(b) by 0 days.

(21) Appl. No.: 17/435,685

(22) PCT Filed: Feb. 26, 2020

(86) PCT No.: PCT/HR2020/000045
§ 371 (c)(1),
(2) Date: Sep. 1, 2021

(87) PCT Pub. No.: WO2020/178490
PCT Pub. Date: Sep. 10, 2020

(65) Prior Publication Data
US 2022/0154591 A1    May 19, 2022

(30) Foreign Application Priority Data
Mar. 1, 2019    (FR) ..................................... 1902156

(51) Int. Cl.
*F01D 11/08*    (2006.01)
*F01D 11/12*    (2006.01)
*F01D 25/24*    (2006.01)

(52) U.S. Cl.
CPC .......... *F01D 11/122* (2013.01); *F01D 25/246* (2013.01); *F05D 2240/11* (2013.01);
(Continued)

(58) Field of Classification Search
CPC .......... F01D 11/08; F01D 11/14; F01D 11/16; F01D 11/18; F01D 11/20; F01D 11/22;
(Continued)

(56) References Cited

U.S. PATENT DOCUMENTS

2008/0178465 A1    7/2008   Schiavo et al.
2018/0051591 A1*   2/2018   Quennehen ............. F01D 25/28
(Continued)

FOREIGN PATENT DOCUMENTS

EP    3 390 783 A1    10/2018
FR    3 033 825 A1    9/2016
(Continued)

OTHER PUBLICATIONS

International Patent Application No. PCT/FR2020/000045, International Search Report and Written Opinion dated Jul. 8, 2020, 8 pgs.
(Continued)

*Primary Examiner* — Eldon T Brockman
*Assistant Examiner* — Maxime M Adjagbe
(74) *Attorney, Agent, or Firm* — Lathrop GPM LLP (57) ABSTRACT

An assembly for a turbomachine turbine includes a housing (1) extending circumferentially about an axis X, sectors (2) intended to form a ring capable of delimiting a gas flow path, each sector (2) comprising a first side (17) and a second side (18) extending radially and circumferentially about the said axis X and spaced axially from each other, each side (17, 18) of the sector (2) including at least one radial bearing surface of an oblong hole capable of cooperating with support pins (13, 14) of the housing (1), at least one of the sides (17, 18) including means (23) for the circumferential positioning of
(Continued)

the sector (2) with respect to the housing (1), wherein each radial bearing surface is cylindrical relative to axis X and is capable of bearing on a complementary cylindrical surface relative to axis X of a support pin.

16 Claims, 6 Drawing Sheets

(52) U.S. Cl.
CPC ...... *F05D 2250/71* (2013.01); *F05D 2260/36* (2013.01); *F05D 2300/6033* (2013.01)

(58) Field of Classification Search
CPC ........ F01D 11/24; F01D 25/24; F01D 25/243; F01D 25/246; F05D 2240/11; F05D 2260/36
See application file for complete search history.

(56) References Cited

U.S. PATENT DOCUMENTS

| | | | |
|---|---|---|---|
| 2018/0073398 A1* | 3/2018 | Quennehen | F01D 25/28 |
| 2018/0156068 A1* | 6/2018 | Roussille | F01D 11/08 |
| 2018/0156069 A1* | 6/2018 | Quennehen | F01D 11/08 |
| 2018/0363507 A1* | 12/2018 | Roussille | F01D 11/18 |

FOREIGN PATENT DOCUMENTS

| | | |
|---|---|---|
| FR | 3 068 072 A1 | 12/2018 |
| WO | WO2017103451 A1 | 6/2017 |

OTHER PUBLICATIONS

French Patent Application No. 1902156, Search Report dated Oct. 28, 2019; 7 pgs.

* cited by examiner

ASSEMBLY FOR A TURBOMACHINE TURBINE

CROSS-REFERENCE TO RELATED APPLICATIONS

This application is a 35 U.S.C. § 371 filing of International Application No. PCT/FR2020/000045 filed Feb. 16, 2020, which claims the benefit of priority to French Patent Application No. 1902156 filed Mar. 1, 2019, which is incorporated herein by reference in its entirety.

TECHNICAL FIELD OF THE INVENTION

The present invention relates to an assembly for a turbomachine turbine, in particular a high pressure turbine.

PRIOR ART

The field of application of the invention is in particular that of turbojet or turboprop aircraft. However, the invention is applicable to other turbomachines, such as industrial turbines.

The invention relates in particular to an assembly comprising a housing extending circumferentially about an axis and sectors intended to form a ring capable of delimiting a gas flow path so as to channel the flow of combustion gases. In particular, the sectors may comprise an abradable material in the radially inner part and be made of a ceramic matrix composite material, or CMC.

In the following, the terms 'axial', 'radial' and 'circumferential' are defined in relation to the axis of the housing.

Ceramic matrix composites, or CMCs, are known for their good mechanical properties, which make them suitable for use as structural elements, and for their ability to maintain these properties at high temperatures. In aircraft turbomachinery in particular, improved efficiency and reduced emissions are leading to the need to operate at ever higher temperatures. Therefore, the use of CMC for various hot parts of such engines has already been considered, especially since CMC has a lower density than traditionally used refractory metals.

Each sector typically comprises a radially inner cylindrical wall, intended to delimit part of the gas flow path, and two axially spaced sides extending radially outwards from the inner cylindrical wall. The inner wall may comprise a coating of abradable material, as is known per se. One of the sides of the housing typically has two circumferentially extending elongated holes spaced circumferentially from each other. The other side of the housing typically has a circumferentially extending elongated hole and a radially extending elongated hole, the two holes being spaced circumferentially from each other.

Each side of the sector can be mounted on a radial flange integral with the housing, by means of pins engaged in the recesses of the housing flanges and in the oblong holes of the corresponding sector. Such an assembly is isostatic, due to the presence of elongated holes and the orientation of these holes. However, since the pins are cylindrical, the contact areas between the pins and the edge of the sector slots are formed by lines. Such line contacts between the pins and the sector generate high Hertz pressures, causing premature wear of the sector by matting or "fretting" during operation.

The document EP 2 784 269 discloses a turbine ring sector comprising pins of elliptical cross-section and pins of rectangular cross-section, engaged in holes in the housing. Due to the clearance between the holes and the pins, and due to positioning and manufacturing tolerances, the contact areas between the pins of the sector and the holes in the housing remain limited. Furthermore, such tolerances also prevent precise radial positioning of the sector with respect to the housing.

The invention aims to remedy such drawbacks in a simple, reliable and inexpensive way.

SUMMARY OF THE INVENTION

To this end, the present invention concerns an assembly for a turbomachine turbine, comprising a housing extending circumferentially about an axis X, sectors intended to form a ring capable of delimiting a gas flow path, each sector comprising a first side and a second side extending radially and circumferentially about the said axis and spaced axially from each other, each side of the sector comprising at least one radial bearing surface capable of cooperating with radial bearing means of the housing, at least one of the sides comprising means for the circumferential positioning of the sector with respect to the housing, characterized in that each radial bearing surface is cylindrical of axis X and is capable of bearing on a complementary cylindrical surface of axis X, integral with the housing.

The use of large diameter cylindrical contact surfaces maximises these contact surfaces and thus reduces the Hertz pressures so as to avoid the aforementioned phenomena of premature wear by matting or "fretting". The term 'cylindrical' can be used to define a surface of a part of a cylinder. The term 'cylinder' here defines a surface of revolution with a circular cross-section.

The cylindrical contact surfaces integral with the housing may be integrally formed with the housing or may be formed by one or more elements separate from the housing and integral with the housing.

The radial bearing surfaces of each side allow the sector to be positioned radially with respect to the housing, the sector being further positioned circumferentially by the corresponding means, said bearing surfaces and circumferential positioning means being adapted to ensure an isostatic mounting.

The first side may comprise first and second circumferentially extending elongated holes spaced circumferentially from each other, the second side comprising a third circumferentially extending elongated hole and a fourth radially extending elongated hole, the third and fourth elongated holes being spaced circumferentially from each other, first, second, third and fourth support pins integral with the housing being engaged respectively in the first, second, third and fourth oblong holes of the sector, the first, second and third pins being capable of bearing radially on the edges of the first, second and third holes, at the level of cylindrical surfaces of axis X.

It is possible to reverse the position of the pins and holes. In other words, the holes can be formed on the housing, while the pins can be formed on the sides of the sector.

The assembly may comprise holding means capable of holding the complementary bearing surfaces of the first, second and third pins of the housing against, respectively, the cylindrical bearing surfaces of the first, second and third oblong holes of the sector.

Such a feature allows the assembly to be produced and assembled with low tolerances. In fact, the holding means allow the cylindrical bearing surfaces of the pins and the corresponding oblong holes to be pressed against each other in the event of radial play between the pins and the said holes, and thus avoid any wear phenomenon.

The first and second pins may be integrally formed with a first support member mounted on the housing, the third pin being integrally formed with a second support member mounted on the housing.

The fourth pin may be integrally formed with the second support member.

The first and second support members may be identical in shape. This reduces the number of separate parts to be made and facilitates the assembly of such an assembly.

The fourth pin may be separate from the second support member.

The fourth pin is, for example, integral with a flange attached to the housing.

The first and second support members can be mounted, respectively, in recesses of a first flange and of a second flange which are integral with the housing.

Each support member may have an arc-shaped part of X-axis, from which the corresponding pin(s) extends, said arc-shaped part being mounted in a groove-like recess of X-axis of the corresponding flange.

One of the flanges may be integrally formed with the housing, the other flange being separate from the housing and fixedly mounted on the housing.

The flange is mounted on the housing by means of screws, for example.

The assembly may include means for circumferentially positioning each support member relative to the housing.

The said circumferential positioning means are, for example, formed by positioning pins mounted in holes in the support members and in flanges integral with the housing.

The invention will be better understood and other details, characteristics and advantages of the invention will appear when reading the following description, which is given as a non-limiting example, with reference to the attached drawings.

DETAILED DESCRIPTION OF THE INVENTION

FIGS. 1 to 6 show an assembly for a turbomachine turbine, comprising a housing 1 extending circumferentially about an axis to be noted X, and contiguous sectors 2 intended to form a ring capable of delimiting a gas flow path. Only one sector 2 is shown in the figures, and only part of the housing 1 is shown. Elements are described herein referring to an axial dimension or orientation along the X axis, a radial dimension or orientation from the X axis, or a circumferential dimension or orientation around the X axis.

For purposes of illustration, the radial distance between the X-axis and both housing 1 and sector 2 as shown in FIGS. 1-8 may not be to scale.

Figure 5:
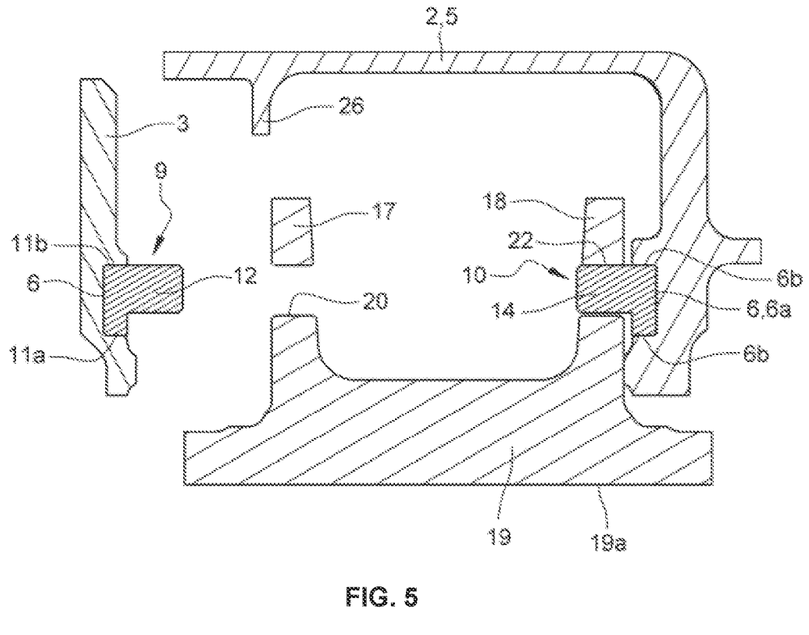
FIGS. 5 and 6 are half sectional views in an axial plane, before and after mounting the removable flange on the housing respectively.
Figure 6:
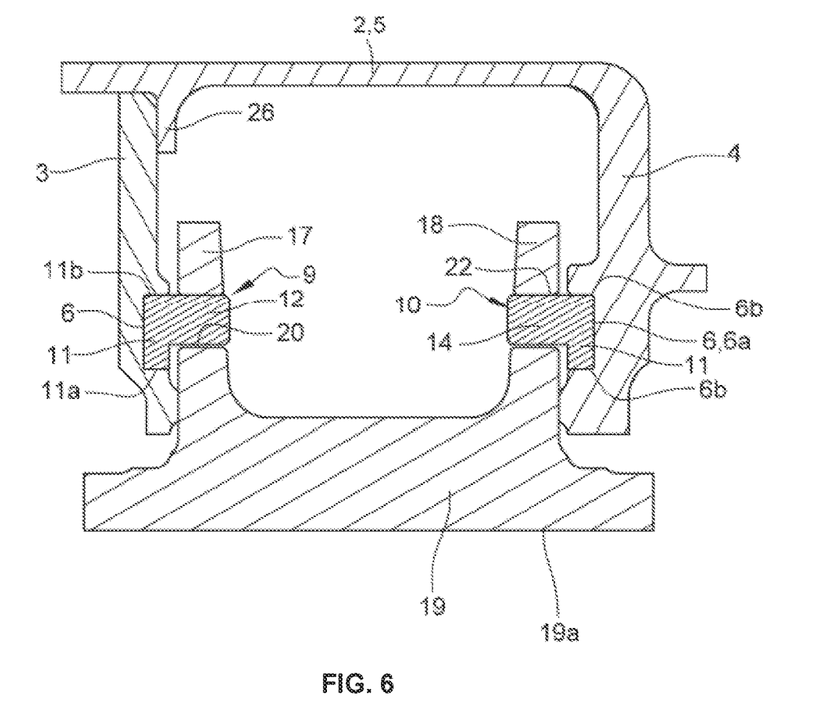

The housing 1 comprises a first flange 3 and a second flange 4 extending radially inwards from an annular part 5 as shown in FIGS. 5 and 6. The first flange 3 is here made of a separate part, fixed to the housing 1, for example by screwing.

Each flange 3, 4 has annular grooves 6 with a radius measured from axis X, opening axially opposite the opposite flange 4, 3. Each groove 6 is delimited by a flat, radial annular bottom surface 6a and two axially extending cylindrical side surfaces 6b. Holes 7 are provided in the bottom surfaces 6a of the grooves 6, with a cylindrical circumferential positioning pin 8 engaged in each hole 7. The pins 8 of each flange 3, 4 may have different dimensions, although they have the same reference 8.

First support members 9 and second support members 10 are mounted on the first flange 3 and the second flange 4 respectively.

In particular, each support member 9, 10 has an arc-shaped part 11, from which two pins 12, 13, 14, 15 extend axially, the two pins 12, 13 or 14, 15 being spaced circumferentially from each other. The pins 12 to 15 are located at the circumferential ends of the arc-shaped part 11. The first support member 9 thus comprises first and second pins 12, 13. The second support member 10 thus has third and fourth pins 14, 15.

Figure 1:
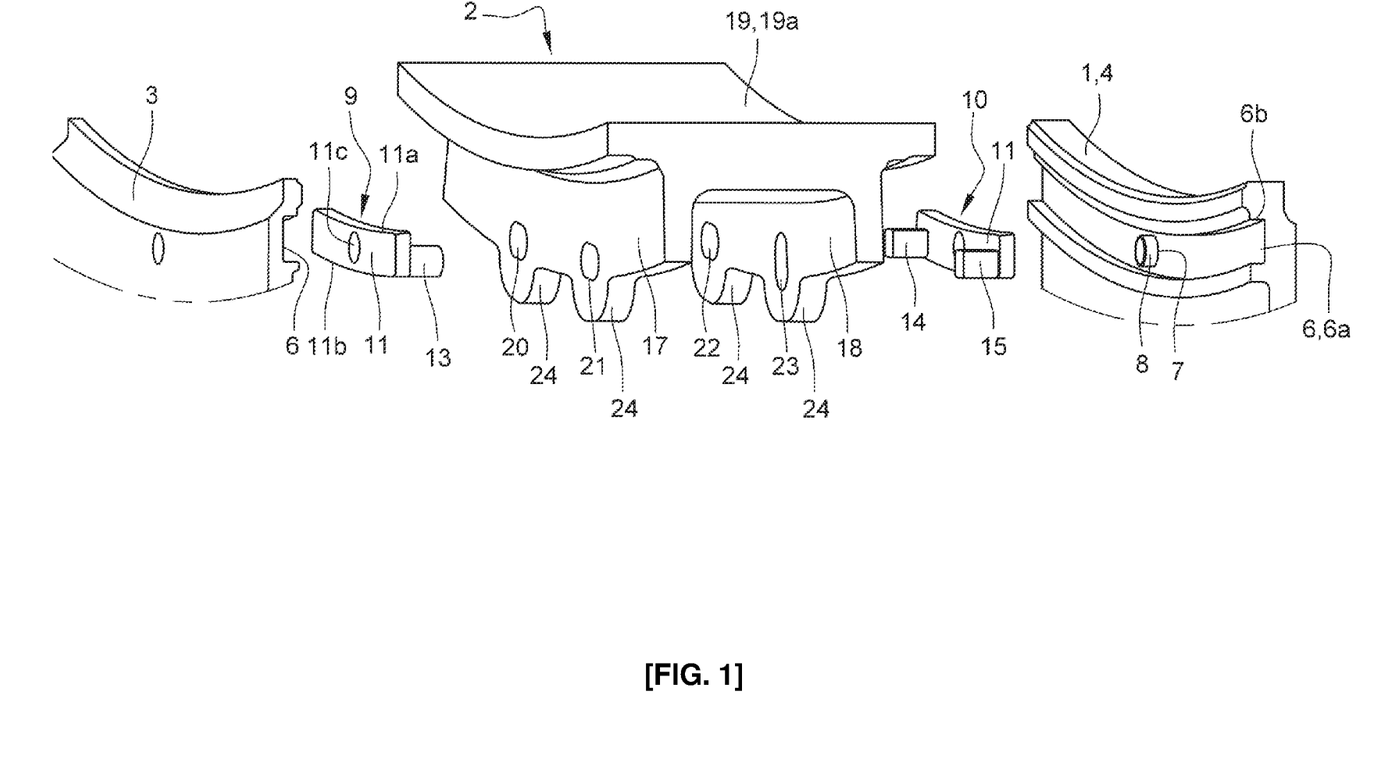
FIGS. 1 and 2 are perspective views of a rotor sector and part of the stator of an assembly according to a first embodiment of the invention.
Figure 2:
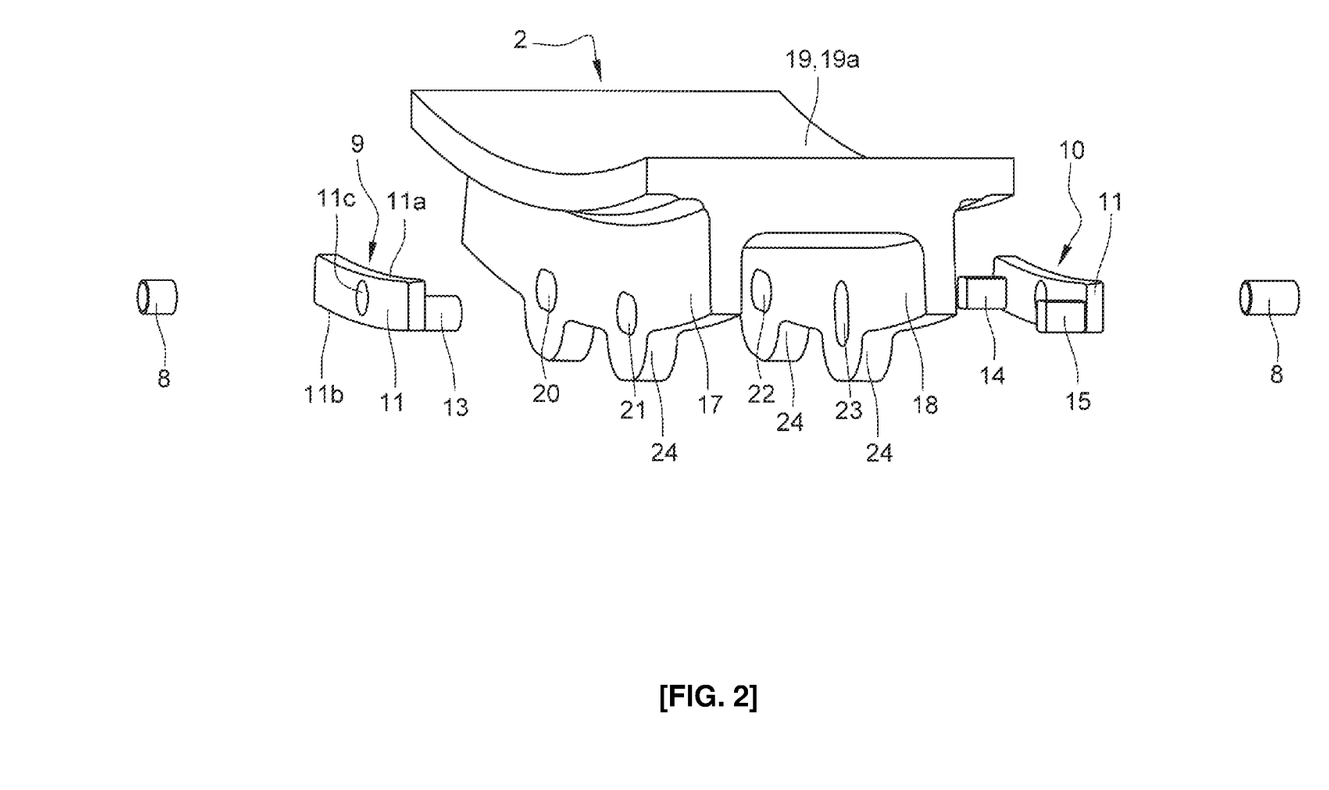
Figure 3:
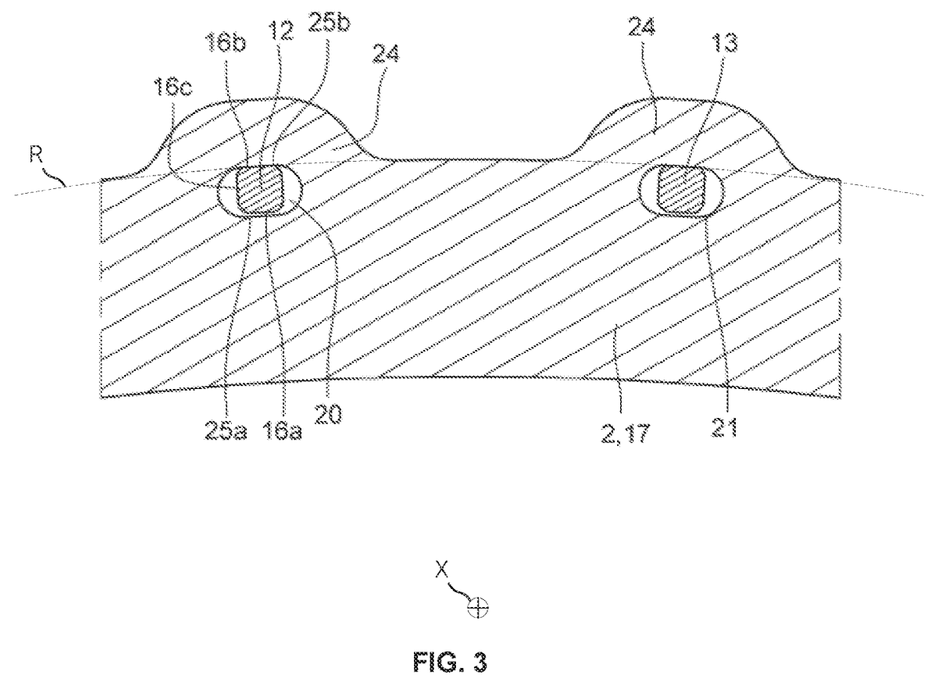
FIG. 3 is a cross-sectional view in a radial plane, showing the mounting of the first and second pins in the corresponding side of a sector.
Figure 4:
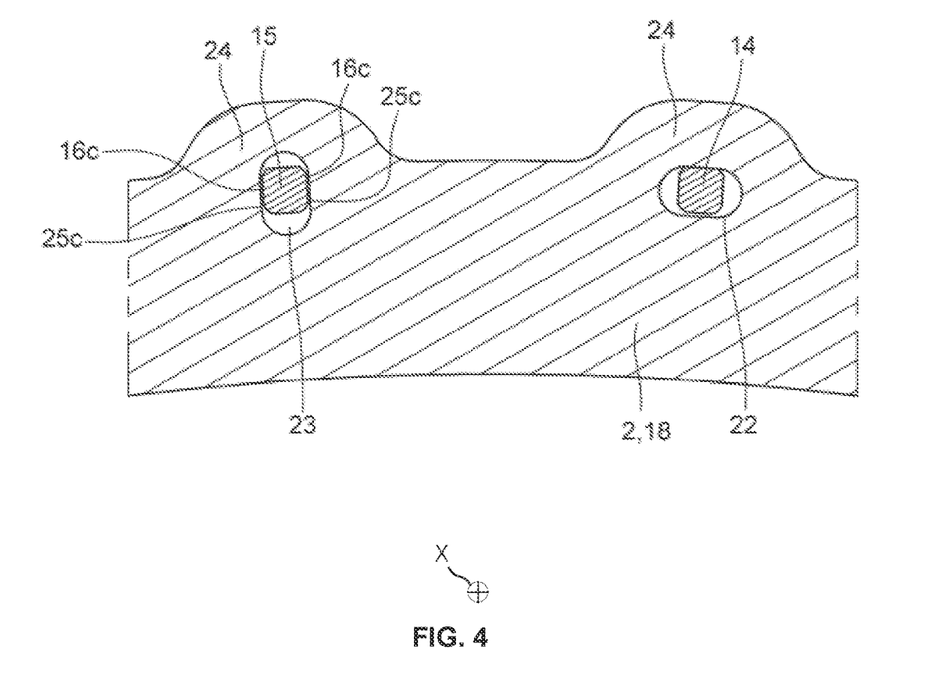
FIG. 4 is a cross-sectional view in a radial plane, showing the mounting of the third and fourth pins in the corresponding side of a sector.

As shown in FIGS. 3 and 4, each pin 12 to 15 has a radially outer cylindrical surface 16b (or part of a cylinder) relative to the X-axis. In embodiments, radially outer cylindrical surface 16b of pins 12 and 13 is shown by dashed line R in FIG. 3. Each pin 12 to 15 has a radially inner cylindrical surface 16a relative to the X-axis and two radially extending side surfaces 16c (FIG. 3). In embodiments, radially inner surface 16a may also be flat. The arc-shaped part 11 of the first support member is mounted in the groove 6 of the first flange 3. The arc-shaped part 11 of the second support member is mounted in the groove 6 of the second flange 4. The arc-shaped part 11 of each support member 9, 10 has a hole 11c (FIGS. 1 and 2) in which the corresponding pin 8 is engaged. The radial dimension of each arc-shaped part 11 corresponds to the radial dimension of the corresponding groove 6. The radially inner and outer edges 11a, 11b of each part 11 are thus capable of bearing on the corresponding side surfaces 6b of the grooves 6, so as to effectively take up the radial forces in operation. The pins 8 are able to absorb circumferential forces, although these forces are relatively small.

Each ring sector 2 has a cylindrical wall 19 (or part of a cylinder) from which two sides 17, 18 extend radially outwards, respectively a first side 17 on the first flange 3, and a second side 18 on the second flange 4. The radially inner surface 19a of the cylindrical wall 19 may comprise a coating of abradable material, as is known per se. Said radially inner surface 19a is intended to delineate a part of the gas flow path within the high pressure turbine of the turbomachine. Each side 17, 18 extends circumferentially around the entire circumference of the sector 2.

The first side 17 has circumferentially extending first and second oblong holes 20, 21 spaced circumferentially from each other. The second side 18 has a third circumferentially extending oblong hole 22 and a fourth radially extending oblong hole 23, the third and fourth oblong holes 22, 23 being spaced circumferentially from each other.

The radially outer ends of the sides 17, 18 have rounded material protrusions 24 opposite the oblong holes 20 to 23.

As described above for pins 12, 13 and 14, the radially inner and outer edges 25a, 25b (FIG. 3) of the first, second and third holes 20, 21, 22 are formed by cylindrical (or part-cylindrical) surfaces relative to the X-axis, as shown by the dashed line R.

The side edges 25c of the fourth hole 23 are radially oriented (FIG. 4), i.e., along a radius relative to the X-axis.

The first, second, third pins 12, 13, 14 may be engaged with no or minimal radial clearance between the radially inner and outer edges 25a, 25b of the first, second and third holes 20, 21, 22, respectively.

The fourth pin 15 may be engaged with no or minimal circumferential clearance between the side edges 25c of the fourth hole 23.

A greater radial clearance can be provided between the first, second and third pins 12, 13, 14 and the first, second and third holes 20, 21, 22 to allow less restrictive dimensional and mounting tolerances. In such a case, it is possible to provide holding means capable of holding the complementary bearing surfaces of the first, second and third pins 12, 13, 14 of the housing 1 against, respectively, the cylindrical bearing surfaces 25a, 25b of the first, second and third oblong holes 20, 21, 22 of the sector 2.

The first, second and third pins 12, 13, 14 can come to bear on the radially inner edges 25a or preferably on the radially outer edges 25b of the first, second and third oblong holes 20, 21, 22, here on the radially outer edges 25b.

When the sectors 2 are mounted in the housing 1, each second support member 10 is mounted in the groove 6 of the second flange 4, and the third and fourth pins 14, 15 of each second support member 10 are engaged in the third and fourth holes 22, 23 of each sector 2, as illustrated in FIG. 5. The first support members 9 are mounted in the groove 6 of the first flange 3, the latter being annular and formed in one piece, or sectorized.

The first flange 3 is then mounted on an annular support flange 26 of the housing 1 and secured to said housing 1, for example by screwing, as shown in FIG. 6. The annular flange 26 extends radially inwards from the annular part 5 of the housing 1. When the first flange 3 is fitted, the first and second pins 12, 13 of the first support member 9 are inserted into the first and second holes 20, 21 of the corresponding sector 2. The radial holding means (not shown) then hold the pins 12 to 14 against the radially outer edges 25b of the holes 20 to 22 of the sector 2.

Figure 7:
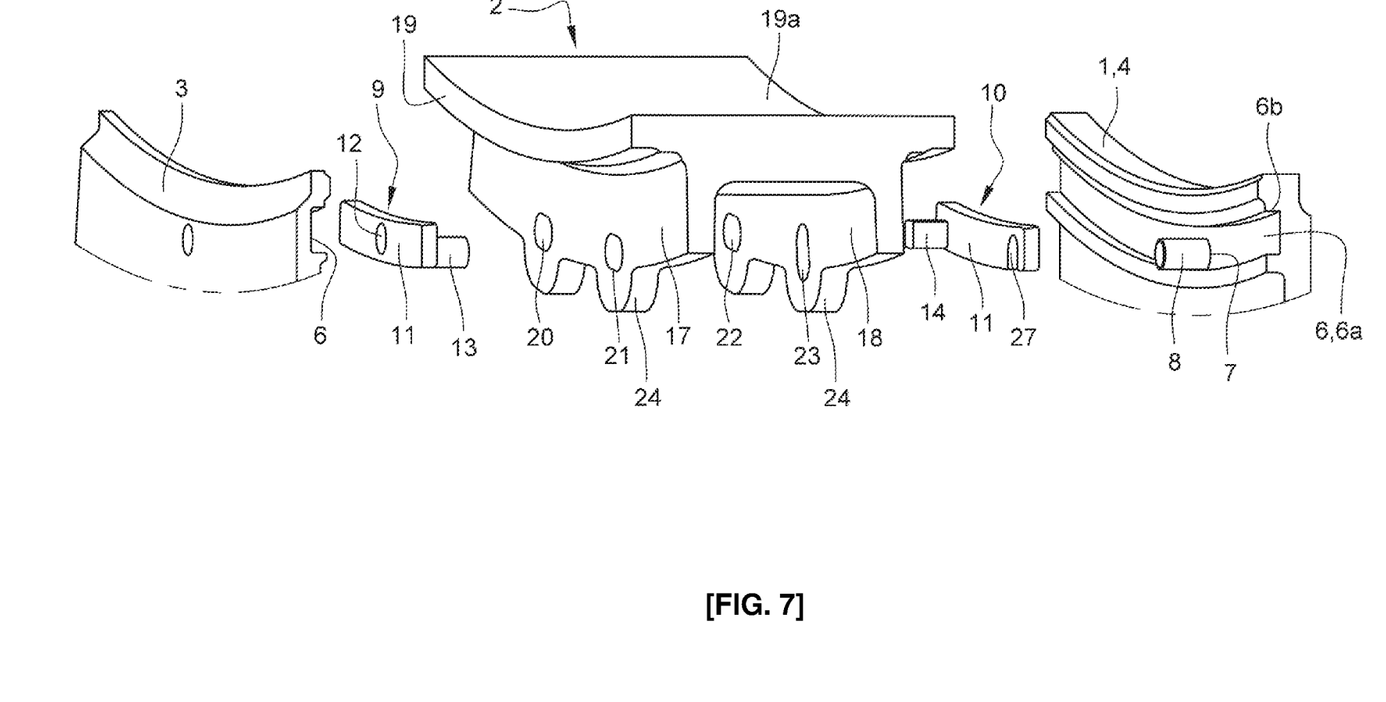
FIGS. 7 and 8 are views corresponding to FIGS. 1 and 2 respectively, illustrating a second embodiment of the invention.
Figure 8:
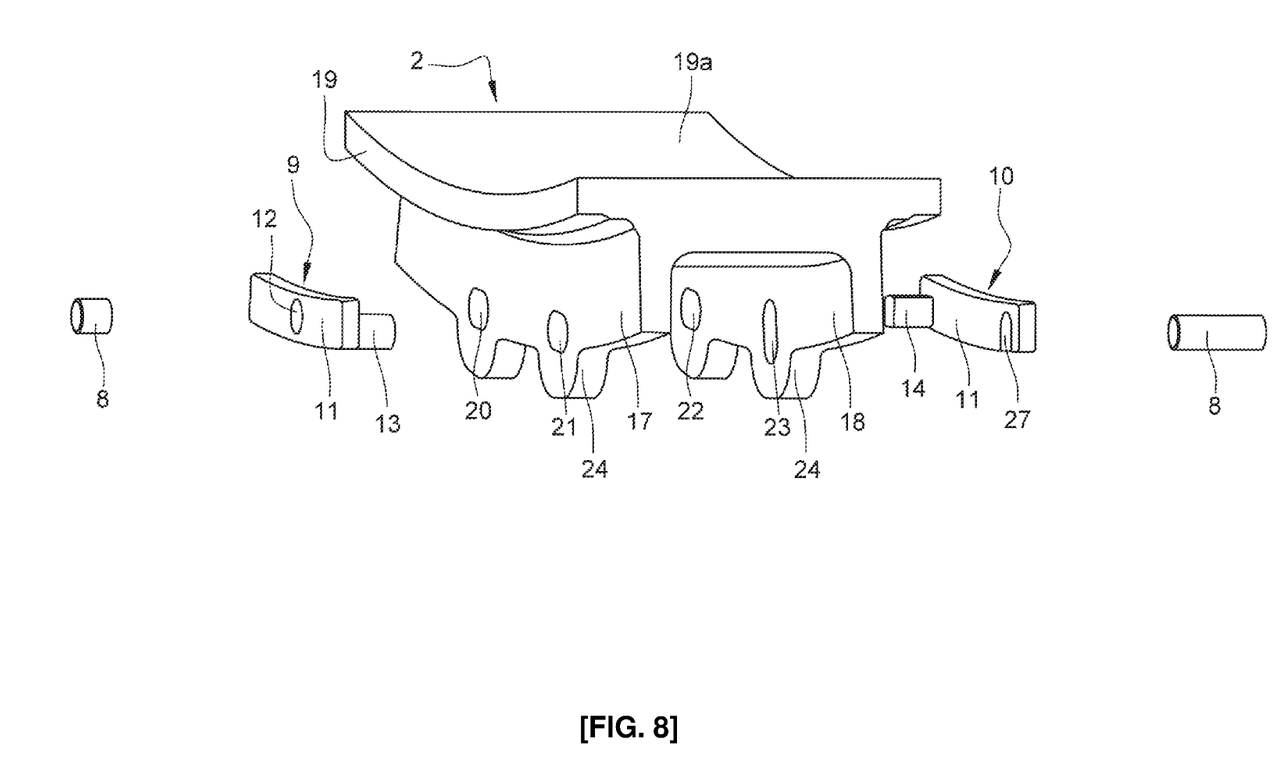

FIGS. 7 and 8 illustrate a second embodiment, which differs from that previously shown with reference to FIGS. 1 to 6 in that the second support member 10 is without a fourth pin 15. The sector 2 is held in place circumferentially by the cylindrical pin 8, which is mounted in a complementary hole 7 in the second flange 4 and in the fourth hole 23 in the sector 2, for example through an opening, a notch 27 or a hole in the second support member 11. The pin 8 can be formed integrally with the second flange 4.

Furthermore, as before, the said pin 8 ensures that the second support member 10 is held in its circumferential position.

In the two embodiments presented, the use of cylindrical contact surfaces 16b, 25b of large diameter, i.e. of a diameter corresponding to the diameter of the pins 12 to 14 in relation to the axis X, makes it possible to maximise the said contact surfaces 16b, 25b and to reduce the Hertz pressures in such a way as to avoid the aforementioned phenomena of premature wear of the sectors 2 by matting or "fretting"

The invention claimed is:

1. An assembly for a turbomachine turbine, comprising a housing (1) extending circumferentially about an axis X, sectors (2) intended to form a ring capable of delimiting a gas flow path, each sector (2) comprising:
a first side (17) and a second side (18) extending radially and circumferentially about the said axis X and spaced axially from each other, each of the first side and second side (17, 18) of each said sector (2) comprising at least one radial bearing surface (25b) of first, second and third oblong holes (20, 21, 22) capable of cooperating with first, second and third support pins (12, 13, 14) of the housing (1), at least one of the first and second sides (17, 18) comprising means (23) for the circumferential positioning of each said sector (2) with respect to the housing (1);
wherein each radial bearing surface (25b) is cylindrical relative to the axis X and is capable of bearing on a complementary cylindrical surface relative to the axis X (16b) of first, second and third support pins (12, 13, 14), integral with the housing (1), and in that the first side (17) comprises the first and second oblong holes (20, 21) extending circumferentially and spaced circumferentially from each other, the second side (18) comprising the third oblong hole (22) extending circumferentially and a fourth oblong hole (23) extending radially, the third and fourth oblong holes (22, 23) being spaced circumferentially from each other, and
wherein the first, second, third and fourth support pins (12, 13, 14, 15) engage respectively in the first, second, third and fourth oblong holes (20, 21, 22, 23) of each said sector (2), the first, second and third support pins (12, 13, 14) capable of coming to bear radially on the radial bearing surfaces of the first, second and third holes (20, 21, 22), respectively; and
wherein the first and second support pins (12, 13) are integrally formed with a first support member (9) mounted on the housing (1), the third support pin (14) being integrally formed with a second support member (10) mounted on the housing (1).

2. The assembly according to claim 1, characterised in that the first and second support pins (12, 13) are integrally formed with a first support member (9) mounted on the housing (1), the third support pin (14) being integrally formed with a second support member (10) mounted on the housing (1).

3. The assembly according to claim 1, characterised in that the fourth support pin (15) is integrally formed with the second support member (10).

4. The assembly according to claim 3, characterised in that the first and second support members (9, 10) are mounted, respectively, in recesses (6) of a first flange (3) and of a second flange (4) which are integral with the housing (1).

5. The assembly according to claim 3, characterized in that it comprises means (8) for the circumferential positioning of each support member (9, 10) with respect to the housing (1).

6. The assembly according to claim 1, characterised in that the fourth support pin (15) is separate from the second support member (10).

7. The assembly according to claim 6, characterised in that the first and second support members (9, 10) are mounted, respectively, in recesses (6) of a first flange (3) and of a second flange (4) which are integral with the housing (1).

8. The assembly according to claim 6, characterized in that it comprises means (8) for the circumferential positioning of each support member (9, 10) with respect to the housing (1).

9. The assembly according to claim 1, characterised in that the first and second support members (9, 10) are mounted, respectively, in recesses (6) of a first flange (3) and of a second flange (4) which are integral with the housing (1).

10. The assembly according to claim 9, characterised in that each support member (9, 10) has an arc-shaped part (11) relative to the axis X, from which the support pins extend, said arc-shaped part (11) being mounted in a groove-like recess (6) relative to the X-axis of the corresponding flange (3, 4).

11. The assembly according to claim 10, characterised in that one (4) of the flanges (3, 4) is integrally formed with the housing (1), the other flange (3) being separate from the housing (1) and fixedly mounted on the housing (1).

12. The assembly according to claim 10, characterized in that it comprises means (8) for the circumferential positioning of each support member (9, 10) with respect to the housing (1).

13. The assembly according to claim 9, characterised in that one (4) of the flanges (3, 4) is integrally formed with the housing (1), the other flange (3) being separate from the housing (1) and fixedly mounted on the housing (1).

14. The assembly according to claim 13, characterized in that it comprises means (8) for the circumferential positioning of each support member (9, 10) with respect to the housing (1).

15. The assembly according to claim 9, characterised in that it comprises means (8) for the circumferential positioning of each support member (9, 10) with respect to the housing (1).

16. The assembly according to claim 1, characterised in that it comprises means (8) for the circumferential positioning of each support member (9, 10) with respect to the housing (1).

* * * * *